United States Patent
Bello

[11] Patent Number: 6,039,339
[45] Date of Patent: Mar. 21, 2000

[54] TOW BALL AND SHIN PROTECTOR

[76] Inventor: Louis Bello, 248 Manassas Dr., Manassas Pk., Va. 20111

[21] Appl. No.: 08/888,248

[22] Filed: Jul. 7, 1997

Related U.S. Application Data

[63] Continuation-in-part of application No. 08/328,273, Oct. 3, 1994, Pat. No. 5,533,743.

[51] Int. Cl.$^7$ ............................................. B60R 21/34
[52] U.S. Cl. ............................................ 280/507; 150/166
[58] Field of Search ................................. 280/507, 504, 280/511; 150/154, 166; 293/142

[56] References Cited

U.S. PATENT DOCUMENTS

| | | |
|---|---|---|
| 3,596,926 | 8/1971 | Randall ................................. 280/507 |
| 4,181,320 | 1/1980 | Wellborn, Jr. ......................... 280/507 |
| 5,037,122 | 8/1991 | Beckerer, Jr. ......................... 280/507 |
| 5,322,316 | 6/1994 | Wheeler ................................. 280/507 |
| 5,533,743 | 7/1996 | Bello ..................................... 280/507 |
| 5,791,677 | 8/1998 | Froehlich .............................. 280/507 |

*Primary Examiner*—Robert J. Oberleitner
*Assistant Examiner*—Pamela J. Lipka

[57] ABSTRACT

A cushioning device for a trailer hitch, includes an opening capable of fitting onto a tow ball of a vehicle, with protrusions extending away from it's body and toward nearby parts of the vehicle or tow bar, exerting pressure against those parts, the rest of the body extending beyond all of the tow ball's outer perimeters thereby providing protection to passersby against accidental injury and enhanced visibility at all times, even when hitched.

4 Claims, 1 Drawing Sheet

TOW BALL AND SHIN PROTECTOR

The present application is a continuation-in-part of, application U.S. Ser. No. 08/328,273 filed Oct. 3, 1994, now U.S. Pat. No. 5,533,743 dated Jul. 9, 1996.

STATEMENT AS TO RIGHTS TO INVENTIONS MADE UNDER FEDERALLY SPONSORED RESEARCH AND DEVELOPMENT

No rights have been given under any federal program.

FIELD OF THE INVENTION

This Invention relates generally to devices that protect a tow ball and at the same time protect personnel from accidental, injurious contact with the exposed parts of a vehicle's towing equipment when towing is not being performed.

BACKGROUND OF THE INVENTION

1. Description of the Prior Art

Trailer hitches of the ball type are often accidentally struck by passersby, causing painful injuries. Cumbersome, expensive devices have been created to preserve the tow ball, but none to fully protect persons from injury. There is a need for a fully effective, inexpensive device.

SUMMARY OF THE INVENTION

The invention is a shock absorbing body made of plastic or rubber foam. The body contains an expandable opening capable of fitting over a tow ball of a vehicle. Protrusions extending away from the body toward the vehicle exert pressure against the nearby parts of said vehicle.

The body extends beyond the towing bar's outer perimeters, thereby providing protection to passersby from accidental injury. Brightly imprinted, this device will embellish this otherwise unattractive area, while adding visibility.

It is therefore a principal object of the invention to provide cushioning for a towing device in order to prevent accidental injury by contact. Another object of the device is to provide protective cover for a towing ball.

Still another object is to attain greater visibility by using bright colors, thereby preventing injury. A further object is to enhance the appearance of the towing area by using interesting colors and shapes. Yet another object is to provide said protection and enhancement at all times, even while towing.

BRIEF DESCRIPTION OF THE DRAWINGS

For a better comprehension of the invention, reference will be had to the accompanying page of drawings in which.

DESCRIPTION OF THE PREFERRED EMBODIMENTS

Figure 1:
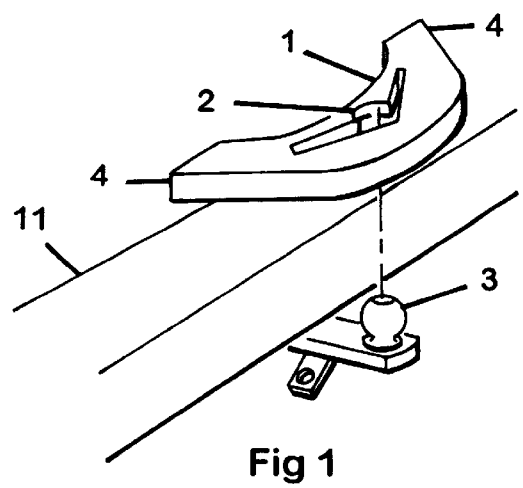
FIG. 1 shows the shock absorbing body(1) of the device, an expandable opening(2) centrally located, a tow ball(3) on a tow bar, and protrusions(4) poised for positioning facing the vehicle's bumper(11).

Referring to the figure page, FIG. 1, there is shown the body(1), cut from a sheet of plastic or rubber foam of a suitable thickness, or molded of such material, and with an expandable opening(2), capable of fitting securely over a tow ball(3) of a vehicle, and with protrusions(4) extending away from the body and toward the vehicle, exerting pressure against the nearby parts of the vehicle, flexing or bending in order to satisfy the varied distances between said tow ball and said parts, the outer perimeter of said body(1), extending beyond the towing bar's outer perimeters, thereby providing protection to passersby against accidental injury, visibility, and protective covering for the tow ball.

Figure 2:
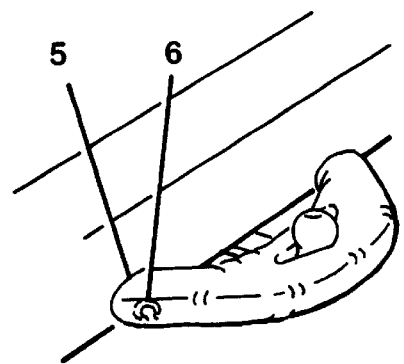
FIG. 2 depicts an inflatable shock absorbing body(5) made of non-porous plastic or rubber and with an opening and plug(6) means to inflate and deflate the unit, on a tow ball.

FIG. 2 shows another embodiment of the device where the shock absorbing body(5), is inflatable, made up of one or more pieces of airtight, pliable plastic or rubber thermally welded about it's outer perimeters as well as around the centrally located opening, one such piece including a spout and plug(6) to inflate and/or deflate the unit.

Figure 3:
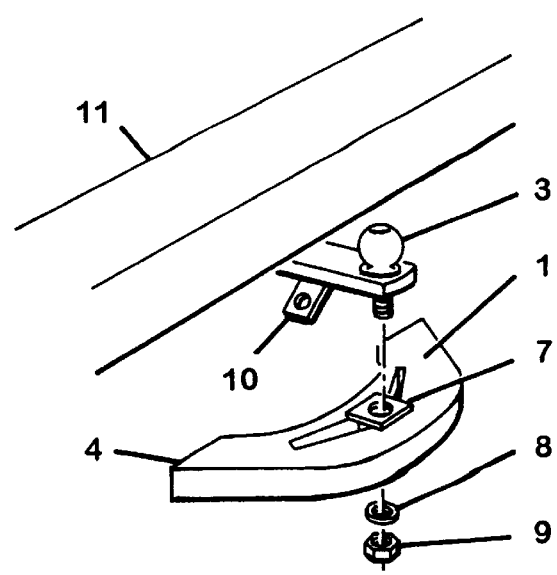
FIG. 3 illustrates a similar shock absorbing body(1) including a plate with opening(7) centrally attached with suitable cement or glue, positioned under the tow ball(3) poised to accept said tow ball's mounting stud and be held in place by said tow ball's washer(8) and nut(9), with it's protrusions(4) facing the bumper(11) and ready to straddle the tow bar's safety chain ears(10).

FIG. 3 shows another embodiment of the invention having a plate(7) attached with suitable cement or glue to the body(1) centrally over the top of the expandable opening(2), and itself containing an opening capable of admitting the stud of the tow ball(3) so that the body may be mounted under the tow bar, using the tow ball's mounting washer(8) and nut(9). In this case the protrusions(4) extending from the body(1) straddle and exert pressure against the tow ball's safety chain mounting "ears"(10). For this model, the expandable opening need not be expandable, but of compatible dimensions.

Figure 4:
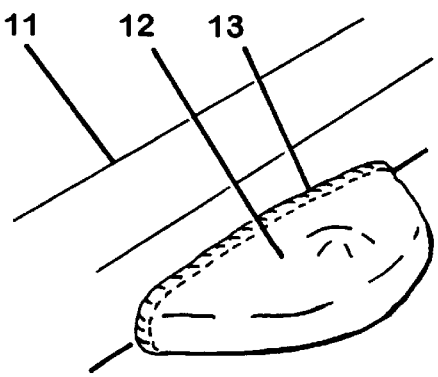
FIG. 4 depicts an imprinted bag(12) with elasticized opening (13), shaped to fit over the parts and fastened by the elasticized opening in order to beautify, and or advertise, as well as to add visibility and further protect. Alternately, hook & loop, pull/tie cord, button, or snap fasteners may be used to secure the bag.

FIG. 4 shows a properly dimensioned bag(12) covering the invention and attached or held in place by an elasticized opening(13). This bag may be imprinted with advertising, or properly colored for beautifying, such as matching the vehicle's color, or complementing the same.

Although an elasticized opening is shown, other fasteners may be used, such as hook and loop, pull/tie cord, snaps or buttons.

While I have illustrated some possible embodiments of my invention, it is to be understood that I do not limit myself to the precise construction herein disclosed. Various changes and modifications may be made within the scope of the invention as defined in the appended claims.

Having thus described my invention, what I claim as new and desire to secure by United States Letters Patent is:

1. A shock absorbing device comprising a body, an expandable opening in the body capable of fitting over a tow ball of a vehicle, and protrusions extending away from the body toward the vehicle which will exert pressure against nearby parts of the vehicle, wherein the body extends beyond the tow ball's outer perimeters thereby providing protection to passersby against accidental injury, enhanced visibility, and a protective covering for said tow ball, wherein said body is inflatable and deflatable, and constructed of pliable, non-porous plastic or rubber stock formed in one or more pieces thermally welded together, and wherein the body further includes spout and plug means of inflation and deflation.

2. The invention as set forth in claim 1, comprising an imprinted bag fitted to the general dimensions of said body and including a hook and loop, elasticized opening, buttons, or snap means of attachment to secure said bag onto said body.

3. A shock absorbing device comprising a body, an expandable opening in the body capable of fitting over a tow ball of a vehicle, and protrusions extending away from the body toward the vehicle which will exert pressure against nearby parts of the vehicle, wherein the body extends beyond the tow ball's outer perimeters thereby providing protection to passersby against accidental injury, enhanced visibility, and a protective covering for said tow ball, wherein said body includes a plate with an opening centrally attached with cement or glue over said expandable opening as a means to mount said body onto said tow ball.

4. The invention as set forth in claim 3, comprising an imprinted bag fitted to the general dimensions of said body and including a hook and loop, elasticized opening, buttons, or snap means of attachment to secure said bag onto said body.

* * * * *